United States Patent [19]

Wiles et al.

[11] Patent Number: 4,606,926

[45] Date of Patent: Aug. 19, 1986

[54] PROCESS FOR PREPARING BUTTER-LIKE SPREAD

[75] Inventors: Robert Wiles; Roger Lane, both of Shropshire, England

[73] Assignee: Milk Marketing Board, Surrey, England

[21] Appl. No.: 705,405

[22] Filed: Feb. 25, 1985

Related U.S. Application Data

[63] Continuation of Ser. No. 540,858, Oct. 11, 1983, abandoned.

[30] Foreign Application Priority Data

Oct. 15, 1982 [GB] United Kingdom ............... 8229484

[51] Int. Cl.$^4$ .............................................. A23D 3/02
[52] U.S. Cl. .................................. 426/603; 426/604; 426/613
[58] Field of Search ................ 426/603, 604, 586, 613

[56] References Cited

U.S. PATENT DOCUMENTS

| 285,878 | 10/1883 | Cochran | 426/603 |
| 3,338,720 | 8/1967 | Pichel | 426/603 X |
| 3,457,086 | 7/1969 | Josefowicz et al. | 426/604 |
| 4,209,546 | 6/1980 | Johansson | 426/586 X |
| 4,307,125 | 12/1981 | Amer | 426/586 X |
| 4,315,955 | 2/1982 | Cramer | 426/586 X |
| 4,425,370 | 1/1984 | Graves | 426/603 |

OTHER PUBLICATIONS

Haighton, (1959), *J.A.O.C.S.*, 36, p. 345.
Mortensen and Danmark, (1982), *Milchwissenschaft*, 37, p. 530.
Dixon and Parekh, (1979), *J. Texture Stud.*, 10, p. 421.
Alsafar, J. Inst. Can. Sci. Technol. Aliment., vol. 7, No. 3, 1974, p. 220.

*Primary Examiner*—Robert Yoncoskie
*Attorney, Agent, or Firm*—Nixon & Vanderhye

[57] ABSTRACT

A butter-like spread which is spreadable direct from the refrigerator is obtained by blending a cream separated from cows milk with edible triglycerides of non-dairy origin and then churning the blend to form a butter-like spread which is separated from the resulting aqueous phase, the proportion of cream and triglyceride in the blend being such that the triglycerides of non-dairy origin represents at least 35% by weight of the total fat content of the spread.

8 Claims, No Drawings

PROCESS FOR PREPARING BUTTER-LIKE SPREAD

This is a continuation of application Ser. No. 540,858, filed Oct. 11, 1983, now abandoned.

DESCRIPTION

This invention relates to a new process for the preparation of a butter-like spread.

Although the United Kingdom and many other countries in the world have statutory requirements relating to churned dairy products sold as butter, particularly in relation to the buffer fat and moisture content, considerable variation can still occur in the composition of such butter products which conform to the statutory requirements. This results from variation in milk composition which itself varies with stage of lactation, composition of feed and plane of nutrition.

One particular property of butter which can vary with varying composition of the milk is the spreadability of the butter. From the consumers point of view, it is desirable that butter should be readily spreadable, e.g. on bread. However, it is the usual practice, even in temperate climates, to store butter under refrigerated conditions, e.g. 5° to 10° C. and, even if a butter is produced which is readily spreadable at room temperature, it is almost never the case that butter taken directly from the refrigerator can be spread easily.

We have now found that it is possible to modify the conventional butter making process by incorporating triglycerides of non-dairy origin in substantial quantities into cream to be used for butter making and that, by matching the composition and the proportion of the triglyceride to the composition of the cream, a butter-like spread can be obtained which has improved spreadability at 5° to 10° C. but which is otherwise substantially indistinguishable in taste and appearance from butter prepared conventionally from cream. Furthermore, by extending the cream with the less expensive triglycerides of non-dairy origin, it is possible to produce a butter-like spread at a significantly reduced cost to conventional butter.

The present invention provides a process for preparing a butter-like spread which comprises blending a cream separated from cows milk with edible triglycerides of non-dairy origin and then churning the blend to form a butter-like spread which is separated from the resulting aqueous phase, the proportion of cream and triglyceride in the blend being such that the triglycerides of non-dairy origin represent at least 35% by weight of the total fat content of the spread. By cream, we mean that part of cows milk rich in fat separated by skimming or other means.

In principle, edible triglycerides of any non-dairy origin can be used. From the practical point of view, consideration must be given to the palatability and compatibility of the triglycerides with cream, the cost of the triglycerides and the physical properties of the triglycerides which in turn are determined in part by the relative proportions of saturated and unsaturated acids forming the triglycerides. The triglycerides used will normally be of vegetable origin although animal triglycerides of non-dairy origin or marine triglycerides can also be used.

Vegetable triglycerides which can be used in the invention include palm oil, peanut oil, sunflower oil, corn oil, soybean oil, coconut oil, rapeseed oil, cottonseed oil etc. In short, any vegetable oil which is a glyceryl triester or a mixture of saturated and unsaturated fatty acids containing between about 10 and 24 carbon atoms will be suitable for use in the process of the present invention.

The proportion of non-dairy triglycerides that can be satisfactorily incorporated in the cream is limited by the need to produce a churnable blend. It is therefore important that the non-dairy triglycerides used have a sufficiently high content of solids at churning temperature i.e. 5°–10° C. Furthermore, a product produced from a blend containing a high proportion of non-dairy triglycerides will tend to have unsatisfactory rheology at ambient temperature unless the blend has a solid fat content within a preselected range at 20° C. In general, we have found that the use of non-dairy triglycerides having a solid fat content of 15–35% by weight at 5° C. (as determined by nuclear magnetic resonance spectroscopy using a Bruker Minispec pc20) and 7.5–25% by weight at 20° C. in our process give rise to a product which is satisfactory in these respects.

Edible triglycerides having the desired characteristics can be obtained, for example, by blending a vegetable oil and a hard stock obtained by partial hydrogenation or fractionation of edible triglycerides of non-dairy origin.

Where the hard stock is produced by hydrogenation, the extent of hydrogenation necessary will depend, of course, upon the extent and nature of the unsaturation in the non-dairy triglycerides to be used, the total amount of non-dairy triglycerides that it is desired to incorporate in the butter, the composition of the cream and the spreadability. characteristics desired in the final product.

One of our preferred vegetable oils for use in the present invention in soyabean oil which contains triglycerides of predominantly linoleic, oleic and palmitic acids. The control of solids content can be achieved by partial hydrogenation of the soyabean oil and then blending the hydrogenated material with untreated soyabean oil to give a blend with the desired properties. We have found that, when we are aiming to produce a final butter-like spread in which the triglycerides of non-dairy origin represents at least 45% by weight, e.g. about 50% of the total fats present, we can use a blend of soyabean oil hardened to a slip melting point of 36°–38° C. and unmodified soyabean oil in weight ratios of 22:78 to 45:55.

The exact degree to which the cream is to be extended by the incorporation of triglycerides of non-dairy origin will depend primarily upon marketing considerations, economic factors and consumer taste and practice being prime controlling factors. Using the technique of partial hardening mentioned above, enables us to incorporate at least 35% by weight triglycerides of non-dairy origin based on the total fat content of the final spread. The upper limit on the amount of triglycerides of non-dairy origins that can be incorporated is not determined by technical factors but, for practical purposes, we have found that amounts can be incorporated which give at least 40% and up to 60% or even 75% triglycerides of non-dairy origin based on the total fat content of the final spread. In order to maintain the dairy character of the final product, we prefer to incorporate not more than about 50% by weight triglycerides of non-dairy origin based on the weight of total fat.

The exact amount of triglycerides of non-dairy origin and their required physical properties when used with a specific cream will need to be determined following a few simple experiments based on the analysis of the cream and the non-dairy triglycerides, the analysis of the final butter-like spread and a decision concerning consumer requirements in the intended market.

The cream and selected non-dairy triglycerides may be blended together, normally at an elevated temperature around 40° to 50° C., conveniently in the presence of suitable emulsifying agents and, optionally, colouring agents where this is necessary, having regard to the natural colour and consumer requirements.

Once the non-dairy triglyceride/cream blend has been prepared, further processing can be in accordance with conventional butter making procedures. Thus, the blend can be pasteurised to 85° to 90° C. and then cooled to 5° to 10° C. and maintained at that temperature in an ageing vat for at least about 8 hours. After the ageing procedure, the blend may be heated slightly, e.g. to about 7° C. and, after optional injection of air, subjected to a conventional churning process e.g. in a continuous butter making machine. Where a salted butter-like spread is required, a slurry of salt can be injected during the butter making process. At the end of the churning process, the solid butter-like spread will have formed leaving, as a separate phase, an aqueous medium analogous to the buttermilk formed in conventional butter churning procedures. The solid butter-like spread is then passed to a packaging plant where the butter-like spread can be processed into tubs or wrapped into blocks giving a product of similar appearance to butter.

The following Examples are given to illustrate the invention.

EXAMPLE 1

675 Kg of a commercially available hardened soybean oil having a slip m.p. of 36°-38° C. and a solid fat content at 5° C. of 84.2% was melted and to this was added 1009 Kg of liquid soya oil, the temperature of the resulting blend being adjusted to about 45° C. This 40:60 by weight blend contained 33.7% by weight fat solids at 5° C. and 15.4% by weight fat solids at 20° C. 6.75 Kg of DIMODAN S (Grindsted Products) (emulsifier) was melted separately and this, together with 1300 ml of Annatto based colour were then added to the molten soybean oil blend and mixed thoroughly. By means of a Bran & Luebbe proportioning pump, the resulting mixture of soybean oil blend, emulsifier and colorant was metered at about 45° C. into freshly produced cream (26.5-27.5% by weight fat content), also at a temperature of about 45° C., in a volumetric ratio of 1 part vegetable oil blend to 3.67 parts cream. The two materials were then thoroughly mixed (with dispersion of the vegetable oil blend into the cream) by passage through an in-line static mixing device. The resulting 'compound cream' was pasteurised at 87°-88° C. and then passed through a vessel at below atmospheric pressure and cooled to about 6° C.

The 'compound cream' was then aged for about 18 hours at 6°-7° C. in a jacketed vessel of the type used for ageing cream in conventional buttermaking. After this ageing, the 'compound cream' was pumped into a continuous buttermaking machine (ETS Simon Freres) at about 7.5° C., air being mixed into the 'compound cream' by a Simon Turbo Cream Feed device (ETS Simon Freres) prior to the churning stage. The continuous buttermaking machine was operated in a similar manner to that for normal buttermaking practice but at a lower throughput of about 2.75 tonnes/hour. The moisture level in the product was adjusted to 19-20%. The salt level was also controlled by introducing an aqueous slurry of sodium chloride as in conventional buttermaking.

The resulting butter-like spread was immediately filled into 250 g tubs on a Benhil tub packing machine with an augur feed hopper. The butter-like spread obtained by this procedure had the following analysis:

|  | % by weight |
|---|---|
| butter fat | 39.2 |
| non-dairy triglycerides | 36.9 |
| water | 20 |
| salt | 1.9 |
| emulsifier | 2 |
| curd |  |

The non-dairy triglycerides comprise 48.5% by weight based on total fat.

Spreadability of the product was measured objectively at 5° C. by means of the Stevens LFRA Texture analyser, a constant speed penetrometer, using a cone angle of 45°, a penetration depth of 7 mm and a rate of 1 mm/sec. The load in grams generated under these conditions correlates well with subjective assessment of spreadability. Values for this product stored at 5° C. for the following times from production are given below:

| After | 3 days | 14 days | 35 days | 66 days |
|---|---|---|---|---|
| Load (g) | 317 | 395 | 422 | 440 |

At the same times after production and at 5° C. values of 800 g to <1000 g have been recorded for butter samples. Analysis of solid fat contents of the product at 5° and 20° C. by pulsed nuclear magnetic resonance gave values of 41.8% by weight and 12.1% by weight respectively.

When the above-described procedure was repeated but replacing the 40:60 blend of hardened soybean oil:-soybean oil, by a blend of the same components in a 25:75 by weight ratio and in a 50:50 by weight ratio, a butter-like spread was obtained having spreadability characteristics similar to those described above for the 40:60 derived product.

EXAMPLE 2

Winter milk fat which is "harder" than summer milk fat e.g. winter milk fat has a solid fat content at 5° C. of about 59% of the total fat.

300 kg of commercially available hardened soyabean oil having a slip. M.Pt. of 36°-38° C. and a solid fat content at 5° C. of 82.4% was melted and to this was added 800 kg of liquid soyabean oil, the temperature of the resulting blend being adjusted to about 45° C. This 27:73 by weight blend contained 23.9% by weight solid fat at 5° C. and 8.5% by weight solid fat at 20° C. 4.48 Kg of Dimodan S (Grindsted Products), an emulsifier, was melted separately and this, together with 2000 ml of Annatto based colour were then added to the molten soyabean oil blend and mixed thoroughly.

As in Example 1 the mixture of oil blend, emulsifier and colourant was metered (at about 45° C.) by means of a Bran & Luebbe proportioning pump into a freshly produced winter cream in a volumetric ratio of 1 part oil blend to 3.67 parts cream. The two materials were thoroughly mixed and the resulting "compound cream" churned in the same way as in Example 1 to give a butter-like spread.

Spreadability of the product was measured by the same method described in Example 1 and the following results were obtained for product stored at 5° C.

| After | 3 days | 11 days | 35 days | 120 days |
|---|---|---|---|---|
| Load (g) | 233 | 283 | 251 | 460 |

The amount of fat in the product due to the non-dairy triglyceride was about 48.5% by weight of the total fat content of the product.

Analysis of solid fat contents of the product at 5° and 20° C. by pulsed nuclear magnetic resonance using a Bruker Minispec pc 20 instrument gave values of 41.6% and 11.6% respectively by weight of the total fat content.

EXAMPLE 3

The spreadability of the product made from any particular source of dairy cream can be further increased by adjusting the weight percent of solid fat in the blend of non-dairy triglycerides as shown in this Example.

The cream used was one in which the solid fat content of the milkfat was 52.5% by weight at 5° C. 443 Kg of a commercially available hardened soyabean oil of slip melting point 36°–38° C. and a solid fat content of 84.5% by weight at 5° C. was melted and to this was added 900 kg of liquid soyabean oil, the temperature of the resulting blend being adjusted to about 45° C. This 33:67 by weight blend contained 26.7% by weight solid fat at 5° C. and 10.3% by weight solid fat at 20° C. 5.45 Kg of Dimodan S was melted separately and this, together with 49.2 g of a 30% suspension of β-carotene (Roche Products) a colourant was then added to the molten soyabean oil blend and mixed thoroughly. This was then mixed with cream (volumetric ratio of oil blend:cream of 1:3.7) and churned as in Example 1 to give a butter-like spread.

The spreadability of the product when measured as described in Example 1 was as follows:

| After | 7 days | 35 days | 50 days |
|---|---|---|---|
| Load (g) | 133 | 242 | 240 |

Analysis of the solid fat content of the product at 5° C. and 20° C. gave values of 38.8% by weight and 10.6% by weight respectively by weight of the total fat content. The amount of non-dairy triglyceride in the product was about 48% by weight of the total fat.

EXAMPLE 4

This illustrates the use of a blend of non-dairy triglycerides other than soyabean oil.

7.0 Kg of a commercially available interesterified palm oil having a slip m.p. of 41° C. and a solid fat content at 5° C. of 71.0% (by weight) was melted and to this was added 9.6 kg of liquid sunflower oil, the temperature of the resulting blend being adjusted to about 45° C. This 42:58 by weight blend contained 30.5% by weight fat solids at 5° C. 67.5 g of Dimodan S was melted separately and this together with 0.44 g of β-carotene 30% suspension were added to the molten oil blend and mixed thoroughly. The resulting mixture of oil blend, emulsifier and colour was added at about 45° C. to 73.4 kg of freshly produced dairy cream of 24% by weight fat content at the same temperature and mixed thoroughly with a 'Ytron' mixer. The resulting 'compound cream' was then heated to 88°–89° C. and cooled to 8°–9° C. in a plate heat exchanger. The cooled 'compound cream' was stored overnight in a cold store (operating at 5° C.) and churned the next day at 7° C. in a pilot scale batch rotary churn in a similar manner to that used for conventional buttermaking. The moisture level of the product was adjusted to about 20% by weight and the salt content to about 1.5% by weight. The resulting product was manually filled into 250 g tubs.

The product composition was similar to that given in Example 1 with non-dairy triglycerides at 48.5% by weight based on the total fat.

The spreadability of the product measured under the parameters given for previous Examples was represented by a load in grams of 500 when the product was 14 days old. Analysis of solid fat contents of the product at 5° and 20° C. by pulsed nuclear magnetic resonance spectroscopy gave values of 43.0% by weight and 13.1% by weight respectively.

We claim:

1. In a process for producing a butter-like spread by blending dairy cream with triglycerides of non-dairy origin the improvement wherein the blend is churned to form a butter-like spread which is separated from an aqueous phase, the proportions of said cream and triglycerides of non-dairy origin are such that the triglycerides of non-dairy origin represent at least 35% by weight of the total fat content of the spread and wherein the solid fat content of said triglycerides of non-dairy origin is such that the blend of cream and triglycerides of non-dairy origin is suitable for churning at 5° to 10° C. and the proportion of triglycerides of non-dairy origin and its solid fat content are matched with the composition of said cream to produce a spread having a spreadability corresponding with a penetrometer load of less than 800 g when tested at 5° C. by a constant speed penetrometer using a cone angle of 45°, a penetration depth of 7 mm and a rate of 1 mm/sec.

2. A process according to claim 1 wherein the triglycerides of non-dairy origin represent 40 to 60% by weight of the total fat content of the spread.

3. A process according to claim 1 or 2, wherein the triglycerides of non-dairy origin are of vegetable origin.

4. A process according to claim 1, wherein the triglycerides of non-dairy origin are a blend of a vegetable oil and a hard stock obtained by partial hydrogenation or fractionation of edible triglycerides of non-dairy origin.

5. A process according to claim 1 wherein the triglycerides of non-dairy origin are derived from soyabean oil.

6. A process according to claim 1 wherein the triglycerides of non-dairy origin comprises at least 45% by weight of the total fats present and comprises a blend of soyabean oil hardened to a slip melting point of 36°–38° C. and unmodified soyabean oil in weight ratios of 22:78 to 45:55.

7. A process according to claim 1 wherein freshly produced dairy cream is employed.

8. A process according to claim 1 wherein the triglycerides of non-dairy origin have the following solid fat contents at the following temperature:
15%–35% by weight at 5° C.
7.5%–25% by weight at 20° C.

* * * * *